United States Patent [19]
Good et al.

[11] Patent Number: 5,948,845
[45] Date of Patent: Sep. 7, 1999

[54] SOLVENT-BASED, THERMAL PAINT

[75] Inventors: John W. Good, Liverpool; Rufus H. Kerry, Syracuse, both of N.Y.

[73] Assignee: P.S.A.M.S., Inc., Inverness, Fla.

[21] Appl. No.: 09/017,078

[22] Filed: Feb. 2, 1998

Related U.S. Application Data

[63] Continuation-in-part of application No. 08/223,113, Apr. 5, 1994, Pat. No. 5,731,374.

[51] Int. Cl.$^6$ ................................................... G08R 3/34
[52] U.S. Cl. ........................ 524/444; 525/445; 525/446; 428/407; 428/446; 428/450; 428/402; 524/261; 524/424; 524/435; 524/445; 524/446
[58] Field of Search .................................. 524/424, 435, 524/445, 446, 765, 858; 525/445, 446; 428/407, 446, 450

[56] References Cited

U.S. PATENT DOCUMENTS

| | | | |
|---|---|---|---|
| 4,074,010 | 2/1978 | Knight | 428/422 |
| 4,155,887 | 5/1979 | Heston | 524/27 |
| 4,484,967 | 11/1984 | Watanabe et al. | 156/151 |
| 4,719,251 | 1/1988 | Dietlein et al. | 523/218 |
| 4,761,310 | 8/1988 | Boaz | 427/314 |
| 4,788,086 | 11/1988 | Mutsuda | 428/34.1 |
| 5,090,983 | 2/1992 | Boaz | 65/25.4 |
| 5,154,768 | 10/1992 | Yamada et al. | 106/450 |

*Primary Examiner*—Marion McCamish
*Assistant Examiner*—John J. Guarriello
*Attorney, Agent, or Firm*—Shook, Hardy & Bacon L.L.P.

[57] ABSTRACT

An organic solvent-based paint is provided which has, among other things, a perlitic component. The paint resists thermal loading and loss. A series addition of components provides the paint efficiently. The paint is useful for many substrates, including metals.

9 Claims, No Drawings

SOLVENT-BASED, THERMAL PAINT

CROSS REFERENCE TO RELATED APPLICATIONS

The present application is a continuation-in-part of U.S. application Ser. No. 08/223,113, filed Apr. 5, 1994, now U.S. Pat. No. 5,731,374.

STATEMENT REGARDING FEDERALLY SPONSORED RESEARCH OR DEVELOPMENT

Not applicable.

BACKGROUND OF THE INVENTION

The present invention concerns an organic solvent-based, thermal paint, which may be considered to contain a ceramic or an inorganic insulative component, and making and using the paint.

Various paints are known, some of which are ceramic. For example, Knight, U.S. Pat. No. 4,074,010, incorporated herein by reference, discloses ceramic-paint coatings, which are multi-layered in nature. Such coatings are made by applying finely-divided material such as 100-micron silica to ceramic paint while it is still wet, curing without fusing the paint, and then applying another coat of ceramic paint.

Boaz, U.S. Pat. Nos. 4,761,310 and 5,090,983, both of which are incorporated herein by reference, disclose a method of bonding an oil-based ceramic paint to a surface of a glass sheet, and a metal enriched scratch resistant ceramic paint, respectively. The latter paint applies to glass as well.

In buildings, particularly those which have a significant amount of exposed metal components, the phenomena of heat loading or loss such as caused by solar radiation or radiative heat loss can be problematical. For instance, metal roofs, to include those painted with conventional paints, can under the influence of solar radiation expand to the point where significant separation can occur from other structural components causing openings which allow water leaks, wind and wind-carried abrasive weathering, and even undesired animal entry, into the building. In general, a rapid grain or loss of heat, particularly from metal building components, which can expand or contract dramatically with the rapid gain or loss in heat, is undesirable. A more moderate gain or loss of heat might be acceptable, but one has little, if any, control of the elements, in particular in the environment where a building structure resides.

As well, metal, to include metal painted with conventional paint, is a notorious heat conductor, which allows for excessive heat loss from the building system on cold days, or excessive heat gain on hot days. Accordingly, it can become economically inefficient and environmentally undesirable to have a building which engenders such problems. Of course, metal is a valuable structural component of many buildings and ofttimes is nearly, if not wholly, indispensable in building construction. Thus, the problem becomes one of adapting to such employment of metal, and ameliorating or overcoming its drawbacks, in buildings.

As regards paint, in general, good adhesion, coverage and hiding are desired properties. In addition, the paint should be tough, resistant to scratching and weathering, and flexible.

BRIEF SUMMARY OF THE INVENTION

It is an object of the present invention to provide an organic solvent-based, insulative paint.

It is a more particular object hereof to provide such a paint which provides an effective barrier to radiative heat gain or heat loss.

It is also an object of the invention to provide such a paint which can be effectively applied to building surfaces, to include those of metal.

It is another object of the invention to provide such a paint which has good adhesion.

It is yet another object of the invention to provide such a paint which has good coverage and hiding.

It is a further object of the invention to provide such a paint which is flexible, has toughness and resistance to scratching and weathering.

To accomplish these and other objects, the present invention provides, in one aspect, an organic solvent-based, insulative paint comprising a mixture which contains at least the following components:

A. A substantial amount of a polyester type film forming agent;
B. A high refractive index pigment;
C. A melamine/melamine-formaldehyde type crosslinker/leveling agent;
D. An amount of organic solvent which is sufficient to assist in mixing the other components, to assist in keeping the paint in a state suitable for application, and to assist in providing a uniform, defect-free film;
E. A catalytic organic acid;
F. A stabilizer of an amino alcohol;
G. A defoaming agent;
H. An extender; and
I. A perlitic insulative agent.

In another aspect, a method of making said paint comprises serially carrying out the following steps:

A. Mixing together a minor amount of a polyester type film forming agent and a high refractive index pigment to provide a first intermediate mixture.
B. Adding to the first intermediate mixture and mixing a major amount of a polyester type film forming agent to provide a second intermediate mixture;
C. Adding to the second intermediate mixture and mixing at least one melamine/melamine formaldehyde type cross-linker/leveling agent to provide a second intermediate mixture.
D. Adding to the third intermediate mixture and mixing an extender to provide a fourth intermediate mixture.
E. Adding to the fourth intermediate mixture and mixing a minor amount of organic solvent containing an aromatic part to provide a fifth intermediate mixture;
F. Adding to the fifth intermediate mixture and mixing a catalytic organic acid to provide a sixth intermediate mixture;
G. Adding to the sixth intermediate mixture and mixing a stabilizer of an amino alcohol to provide a seventh intermediate mixture;
H. Adding to the seventh intermediate mixture and mixing a defoamer to provide an eighth intermediate mixture;
I. Adding to the eighth intermediate mixture with further mixing to at least substantial uniformity a perlitic insulative agent to provide a ninth intermediate mixture, and
J. Adding to the ninth intermediate mixture a major amount of organic solvent containing an aromatic part, and mixing to provide said paint.

The paint of the invention is useful in protecting buildings and other structures, particularly components thereof which are made of metal to include steels and so forth, and the applied paint and substrate composition is a further aspect of the present invention. Significantly, the paint of the invention provides not only good heat insulation, but also good adhesion especially to metals, coverage, hiding, toughness and resistance to scratching and weathering, and flexibility. The method quite surprisingly affords a desirable paint mixture, and its steps when taken out of turn do not afford such a desirable paint. The present invention can ameliorate or solve problems in the art, to include as aforesaid, and it fulfills objects of the invention. Numerous further advantages attend the invention.

DETAILED DESCRIPTION OF THE INVENTION

The paint hereof is a solvent-based, insulative formulation. The terms "solvent" or "organic solvent" employed herein, and in conjunction with the term "based", are intended to mean an organic compound which functions as a diluent, or an active or latent solvent for the other components hereof, as part of the vehicle hereof, as appropriate.

The paint hereof contains a substantial amount of a polyester, or the like, i.e., type, component, present in any suitable amount. This component is a copolymer and functions as a film forming agent. Typically, the polyester has a backbone of a polyester polymer formed from condensation of dibasic acid and polyhydric alcohol to form the polymer. Typically, this film forming agent makes up the largest part of the paint.

The paint hereof contains a high refractive index pigment and an extender, present in any suitable amount. The pigment may be any suitable pigment having a high refractive index, to include white, black and/or colored pigments. The refractive index of the pigment is generally above 1.5. Organic pigments such as lampblack, phthalocyanine blue or Hansa yellows, and so forth and inorganic pigments such as white lead carbonate or sulfate zinc oxide (which may function as a mild mildewicide as well), iron oxide, chromium oxide, titanium dioxide, and so forth, may be employed. Preferably, the pigment has an index of refraction of about 2.5 or greater and is considerably light reflective. For example, the high refractive index pigment can be or contain titanium dioxide, typically of the rutile form (nonchalking with index of refraction 2.7), and of a general particle size about from 0.2 to 0.3 or so microns in diameter. In practice, the titanium dioxide is about 0.22 microns in diameter with some variation in particle size.

The extender, which may be also known as a filler can be any suitable material, to include one or more inorganic extenders such as silicates to include talc (magnesium silica), silica, clay, mica, and so forth and the like. Preferably, the extender is composed of a filler such as, for example, amorphous silica (synthetic). The size of extender particles may vary with the application, and may be found within particles of a size about from 2 microns to 15 microns in diameter. Typically, the high refractive index pigment is present in a major amount in comparison to the extender, which is thus present in a minor amount in comparison to the pigment, and together, the pigment and extender make up a substantial part of the paint, often only second in amount to the film forming agent.

The paint hereof contains an amount of organic solvent containing an aromatic part, present in any suitable amount. The amount of solvent is sufficient to assist in mixing the other components, to assist in keeping the paint in a state suitable for application, and to assist in providing a uniform, defect-free film. The aromatic part may be composed of or contain such aromatic compounds as of mixtures of alkylated benzenes such as toluene, xylenes, phenylethanes, phenylpropanes to include cumenes, mixtures of methyl, ethyl, propyl, butyl benzenes, alkylated naphthalenes, and so forth and the like. It may contain indans, indenes, tetrolines, and so forth and the like. Preferably, the aromatic part is composed of a composition such as, for example, a mixture of aromatics, especially of or predominately of hydrocarbons, especially having an aromatic content by volume of at least about 95 and preferably at least about 99 percent, such as obtainable from distillation of coal tar, say, having a boiling point (b.p.) about from 150 to 250 degrees C. The solvent is added to make up a substantial part of the paint, often only second or even perhaps approximate in amount to the pigment and extender component.

The paint hereof contains a melamine/melamine-formaldehyde, or the like, i.e., type, cross-linker/leveling agent, present in any suitable amount. By the term "cross-linker/leveling agent" is meant a compound or composition which functions as either a cross-linking agent or a leveling agent, or both, in the paint hereof. Suitable melamine-formaldehydes includes unalkylated and alkylated melamine-formaldehydes such as having about from one-carbon to six-carbon substituents for each melamine nucleus, which substituents may be single in nature or approach or even per-substituted. Degrees of polymerization may range from about 1 to 30 or so. Preferably, a lower, alkyl substituted hexamethoxymethylmelamine with a degree of polymerization of about from 1 to 3 is employed. Typically, the cross-linker/leveling agent is present in a fairly small amount, and less in amount than the organic solvent.

The paint hereof contains a perlitic insulative agent, present in any suitable amount. This is preferably an expanded perlitic material. For example, the insulative agent can be expanded perlite. The insulative agent is a prime provider of thermal resistance in the paint of the invention. Preferably, it is uniformly distributed throughout the paint. Typically, the perlitic insulative agent makes up a surprisingly small amount of the paint to achieve its thermally resistant effect, often approximately about or even less in amount than the cross-linker/leveling agent.

The paint hereof contains a catalytic organic acid, present in any suitable amount. The catalytic organic acid has a function of catalyzing cross linking, assisting curing and so forth, to form a desired film with the film forming agent, and so forth. Such acids are well know, an illustrative example of which is Dinonylnapthalene sulfonic acid (DNNSA). Typically, the catalytic organic acid is present is a very small amount, less than the perlitic insulative component.

The paint hereof contains a stabilizer of an amino alcohol present in any suitable amount. As the stabilizer, there may be mentioned such compounds as amino alcohols, which are preferably substituted alkyl compounds. Examples include 2-aminoethanol, 2-aminopropan-1-ol, 2-amino-2-methylpropan-1-ol, 2-amino-2-methyl butan-1-ol, and so forth and the like. Typically the stabilizer is present is a very small amount, often in an amount even less than the catalytic organic acid.

The paint hereof contains a defoaming agent, of any suitable make-up and present in any suitable amount. The defoaming (antifoaming) agent reduces foaming of the paint, especially about its air-interface surface, which may unduly interfere with processing and/or application. Some examples of known defoaming agents are 2-octanol, sulfonated oils, organic phosphates, silicone fluids, dimethylpiolysiolxane, polyhethylene glycol mixed esters, polymeric alkoxylates of saturated or unsaturated carboxylic acids, semi-solid waxy metal carboxylates, metallic soaps of stearic acid, and reacted silicas. The defoaming agent may have no silica. Preferably, the defoaming agent is employed by addition in the final stages of manufacture of the paint. Typically, the defoaming agent make sup a small amount of the paint to be effective, often present in an amount approximately near to the amount of the aforesaid catalytic organic acid.

The following table illustrates some ranges that components of the paints may generally be found about, in parts by weight:

| Paint Component | General Range | Preferred Range |
|---|---|---|
| Film forming agent | 45 to 65 | 50 to 60 |
| High refractive index pigment | 10 to 30 | 15 to 25 |
| Extender | 2 to 15 | 2 to 5 |
| Solvent | 8 to 35 | 11 to 22 |
| Cross-linker/leveling agent | 1 to 8 | 2 to 5 |
| Perlitic insulative agent | 0.5 to 10 | 1 to 3 |
| Catalytic organic acid | 0.1 to 1 | 0.2 to 0.5 |
| Amino alcohol stabilizer | <0.1 to 0.5 | 0.1 to 0.3 |
| Defoaming agent | <0.1 to 0.5 | 0.1 to 0.3 |

Actual amounts may vary depending on various factors. Also, other substances may or may not be present as desired.

The paint hereof can be made by a method where at least the aforesummarized steps are carried out. The steps are conducted serially, i.e., one after another in the indicated series.

Typically, the method is a batch method. A suitable vessel with suitable agitation or stirring devices is employed.

To provide the first intermediate mixture, a minor amount of a polyester type film forming agent and a high refractive index pigment are added, generally with mixing, and further mixed. Mixing may be at a suitable speed, for example, a high speed, with the grind of the mixture being checked as needed. Preferably, the Hegman grind of the first intermediate mixture is about from 6 to 8. The speed of the mixing should not be such that excessive air is introduced into the mixture.

To provide the second intermediate mixture, added to the first intermediate mixture with mixing is a major amount of a polyester type film forming agent.

To provide the third intermediate mixture, added to the second intermediate mixture is a melamine/melamine-formaldehyde type cross-linker/leveling agent. Preferably, hexamethoxymethylmelamine (CYMEL 303) is utilized.

To provide the fourth intermediate mixture, added to the third intermediate mixture with mixing is a minor amount of organic solvent containing an aromatic part. Preferably, aromatic mainly hydrocarbon mix (AROMATIC #150) is utilized.

To provide the fifth intermediate mixture, added to the fourth intermediate mixture with mixing is a catalytic organic acid. Preferably, DNNSA (NACURE 1051, supplied by King Industries) is utilized.

To provide the sixth intermediate mixture, added to the fifth intermediate mixture with mixing is a stabilizer of an amino alcohol. Preferably, a 2-amino-2-methyl-1-propanol (2 AMP REGULAR) is utilized.

To provide the seventh intermediate mixture, added to the sixth intermediate mixture and mixing is a defoamer. Preferably, a defoamer sold by Witco Chemical Co. under the brand name BALAB 760 is utilized.

To provide the eighth intermediate mixture, added to the seventh intermediate mixture with mixing is an extender. Preferably, synthetic amorphous silica (SYLOID C-812) is utilized.

To provide the ninth intermediate mixture, added to the eighth intermediate mixture with further mixing to at least substantial uniformity a perlitic insulative agent. Preferably, 1-2 10 micron-sized expanded perlite (CERAMIC SIL 42-18) is used.

To provide the paint hereof, added to the ninth intermediate mixture is a major amount of organic solvent containing an aromatic part (SOLVESSO #150). Final mixing, often for a fairly short time, to desired consistency is then typically carried out.

The prepared paint formulation is then typically tested for quality, and drawn for distribution and use.

Following the method of the invention, a desirable paint mixture is thus afforded. However, when steps of the method are taken out of turn, desirable results typically do not obtain.

The paint is preferably applied by roll coating but can also be applied by brushing, rolling, sponging, spraying, and so forth, to a suitable substrate.

The paint of the invention is useful in coating and protecting buildings, other structures, and components thereof, particularly those which are made of metal, to include roofs, window frames, door frames, other wall panels or beams, exteriors of boilers, storage tanks for water or fuel, ships, and so forth. The paint is preferably applied to the metal in a roll coating process and the metal is then used in the erection or construction of the structures. Alternatively, the paint may be applied to the structure following erection. Steel is an advantageous substrate. A primer or undercoat may be applied to the substrate initially.

Of great significance, the paint hereof, with its perlitic component, provides good heat insult, as from protection from solar radiation or radiative heat loss, which is significantly better than conventional paints. It also can provide good adhesion, especially to metals, good coverage, hiding, toughness and resistance to scratching and weathering, and flexibility.

The following example further illustrates the invention, with parts and percentages indicated by weight.

EXAMPLE

Component items to make-up a paint of the invention are provided, on a weight basis, as follows:

| Item | Percent | Material and Function |
|---|---|---|
| 1 | 14.24 | Chempol 11-3376 Polyester (Supplier: Cook Chemical Composites) Film Forming Resin |
| 2 | 17.85 | Titanium Dioxide - Kronos 2310 (Supplier: Kronos, Inc.) 0.22 Micron-size Pigment |
| Procedure - Cowles Grind Above to 7½ Hegman Grind (As before) | | |
| Procedure - Add Following Items to Orind in Order Shown | | |
| 3 | 43.80 | Chempol 11-3376 Polyester (As Above) |
| 4 | 2.94 | Cymel 303 (Cytec Industries, Inc.) Hexamethoxymethylmelamine (degree of polymerization about (ca.)1.7) cross linker |
| 5 | 2.64 | Aromatic #150 (Exxon Chemical Americas) Aromatic mainly hydrocarbon mix (b.p. ca. 185–204 degrees C.; including methyl, ethyl, and propyl substituted benzenes and napthaleues, indones, indenes, and tetrolines, mainly benzenes, ca. 9% napthaleues; mainly 10-carbon aromatics ca. 6% 9-carbon aromatics, ca. 20% 11-carbon aromatics) solvent |
| 6 | 0.10 | Nacure 1051 (Supplier: King Industries) Dinonylnapthalene Sulfonic Acid (DNNSA) Catalyst |
| 7 | 0.16 | 2 Amp Regular (Supplier: Angus Chemical Co.) 2-amino-2-methyl-1-propanol stabilizer |
| 8 | 0.15 | BALAB 760 - defoamer |
| 9 | 3.28 | Syloid C-812 Synthetic Amorphous Silica (Supplier: W.R. Grace Co.) 2.5–15.0 Microns Extender Including for Gloss Control |
| 10 | 1.74 | Ceramic Sil 42-18- (Supplier: Silbrco Corp.) 1–210 micron-sized expanded perlite insulative agent |
| 11 | 13.11 | Solvesso #150-solvent |

Therewith, the solvent-based, insulative paint is made, adding all component items sequence, as follows:

Add the first two items (Nos. 1 & 2) to mixing tank under agitation, and with Cowles dissolver set at high speed (1000–2000 rotations per minute (rpm)), mix until a 7.5 Hegman grind is attained. During the dispersion phase, and for all subsequent additions, the height and/or speed dissolver blade should be adjusted to avoid excessive air being sucked into the batch resulting too deep a vortex or too high a speed.

Add the next seven items (Nos. 3–9 sequentially) with mixing.

With continued mixing at the high speed, add the next item (No. 10) very slowly to vortex of the batch. Add it in increments at a rate such that the expanded perlite goes into the batch and does not float on the surface. When all of the 10th item is added, scrape down the sides of the vessel, and allow the batch to mix until all large agglomerates are dispersed.

Finally, add the last item (No. 11). Mix for 5 minutes.

The dissolver is then turned off. A sample can be drawn from the batch for quality control testing.

The sample is allowed to age at least 16 hours before running quality control tests. The following properties are observed:

Viscosity: 38–42 seconds on #4 Zahn cup at 75 degrees F (24 degrees C).

Film: Coating is applied to 16 and 24 gauge galvanized steel panels, over a corrosion resistant acrylic emulsion primer, to a dry film thickness of 1.2 to 2.0 mils. For lab tests, uniformity in film thickness is achieved by spraying rather than using a #26 draw down wire. Bake coating for 45 seconds at 550–560 degrees F (288–293 degrees c) in a circulating oven to achieve a Panel Metal Temperature (P.M.T) of 450 degrees F (232 degrees C). After removing the panels from the oven, immediately quench with cold water, and then allow the panels to stabilize at room temperature for 15–20 minutes. The following is observed:

1. Color: Straight untinted white.
2. Hardness: Passes F to 2H pencil hardness.
3. Flexibility: Passes a 1-T bend. Using the SCOTCH tape test, no coating is removed at the bend when the tape is removed.
4. Solvent resistance: Coating withstands a minimum of 75 double rubs with a rag soaked in methyl ethyl ketone before coating is removed down to substrate.

The batch is drawn. It makes an excellent thermal paint.

The present invention is thus provided. Numerous adaptations can be effected by those skilled in the art within the spirit of the invention.

We claim:

1. An organic solvent-based, insulative paint comprising a mixture of the following components:
   A) About 45 to 65 parts by weight of a polyester film forming agent;
   B) About 10 to 30 parts by weight of a pigment having a refractive index of at least about 1.5;
   C) About 1 to 8 parts by weight of a melamine/melamine-formaldehyde cross-linker/leveling agent;
   D) About 8 to 35 parts by weight of an organic solvent;
   E) About 0.1 to 1 parts by weight of a catalytic organic acid;
   F) About 0.1 to 0.5 parts by weight of a stabilizer of an amino alcohol; and
   G) About 0.1 to 0.5 parts by weight of a defoaming agent.
   H) About 2 to 15 parts by weight of an extender;
   I) About 0.5 to 10 parts by weight of a 1–210 micron sized perlitic insulative agent.

2. The paint of claim 1, wherein the perlitic insulative agent is expanded perlite. about 1.7; the perlitic insulative agent is expanded perlite; and the stabilizer of an amino alcohol is 2-amino-2-methyl-1-propanol.

3. The paint of claim 1, wherein the high refractive index pigment is titanium dioxide, and the extender is amorphous silica; the organic solvent contains nine to eleven carbon aromatic hydrocarbons, to include alkyl benzenes, with a boiling range about from 185 to 204 degrees C.; the melamine/melamine-formaldehyde cross-linker/leveling agent includes hexamethoxymethylmelamine having a degree of polymerization of about 1.7; the perlitic insulative agent is expanded perlite; and the stabilizer of an amino alcohol is 2-amino-2-methyl-1-propanol.

4. The paint of claim 3, wherein generally, the film forming agent is present in an amount about from 50 to 60 parts by weight (pbw); the titanium dioxide is present in an amount about from 15 to 25 pbw, and the amorphous silica is present in an amount about from 2 to 5 pbw; the organic solvent is present in an amount about from 11 to 22 pbw; the hexamethoxymethylene is present in an amount about from 2 to 5 pbw; the expanded perlite is present in an amount about from 1 to 3 pbw; the catalytic organic acid is present in an amount about from 0.2 to 0.5 pbw; the 2-amino-2-methyl-1-propanol is present in an amount about from 0.1 to 0.3 pbw; and the defoaming agent is present in an amount about from 0.1 to 0.3 pbw.

5. A method of making an organic solvent-based, insulative paint, which method comprises serially carrying out the following steps:

A) Mixing together a minor amount of a polyester film forming agent and a high refractive index pigment, having a refractive index of at least about 1.5, to provide a first intermediate mixture;

B) Adding to the first intermediate mixture and mixing a major amount of a polyester film forming agent to provide a second intermediate mixture;

C) Adding to the second intermediate mixture and mixing at least one melamine/melamine-formaldehyde cross-linker/leveling agent to provide a third intermediate mixture;

D) Adding to the third intermediate mixture a minor amount of organic solvent containing an aromatic part to provide a fourth intermediate mixture;

E) Adding to the fourth intermediate mixture with mixing a catalytic organic acid to provide a fifth intermediate mixture;

F) Adding to the fifth intermediate mixture a stabilizer of an amino alcohol to provide a sixth intermediate mixture;

G) Adding to the sixth intermediate mixture and mixing a defoamer to provide a seventh intermediate mixture;

H) Adding to the seventh intermediate mixture and mixing an extender to provide an eighth intermediate mixture;

I) Adding to the eighth intermediate mixture with further mixing a 1–210 micron sized perlitic insulative agent, 1 to 3 parts by weight, to provide a ninth intermediate mixture, and J) Adding to the ninth intermediate mixture a major amount of organic solvent containing an aromatic part, and mixing to provide said paint.

6. An article of manufacture comprising a substrate having attached thereto a residue of the paint of claim 1.

7. The article of claim 6, wherein the substrate is metal.

8. The article of claim 7, wherein an undercoat is present.

9. The article of claim 8, wherein the metal is steel.

* * * * *

UNITED STATES PATENT AND TRADEMARK OFFICE
CERTIFICATE OF CORRECTION

PATENT NO. : 5,948,845
DATED : September 7, 1999
INVENTOR(S) : John W. Good and Rufus H. Kerry It is certified that error appears in the above-indentified patent and that said Letters Patent is hereby corrected as shown below:

On the title page, item "[45] Date of Patent: Sep. 7, 1999" and replace with --[45] Date of Patent: *Sep. 7, 1999--

On the cover page of the patent, before "Appl. No.: 09/017,078", please insert the following:

--[*] Notice: The term of this patent shall not extend beyond the expiration date of Pat. No. 5,731,374.--

Signed and Sealed this

Twelfth Day of September, 2000

Attest:

Q. TODD DICKINSON

*Attesting Officer*         *Director of Patents and Trademarks*